(12) United States Patent
Bian et al.

(10) Patent No.: US 10,295,390 B2
(45) Date of Patent: May 21, 2019

(54) METHOD AND SYSTEM FOR SENSING A LIQUID LEVEL

(71) Applicant: KONINKLIJKE PHILIPS N.V., Eindhoven (NL)

(72) Inventors: Wei Bian, Eindhoven (NL); Kin Leong Yip, Eindhoven (NL); Yao Hean Chiah, Eindhoven (NL); Kwong Lim Chin, Eindhoven (NL); Gary Chi Yang Lim, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 173 days.

(21) Appl. No.: 15/549,417

(22) PCT Filed: Feb. 19, 2016

(86) PCT No.: PCT/EP2016/053612
§ 371 (c)(1),
(2) Date: Aug. 8, 2017

(87) PCT Pub. No.: WO2016/155943
PCT Pub. Date: Oct. 6, 2016

(65) Prior Publication Data
US 2018/0023992 A1 Jan. 25, 2018

(30) Foreign Application Priority Data
Mar. 30, 2015 (EP) .................................... 15161639

(51) Int. Cl.
*G01F 23/26* (2006.01)

(52) U.S. Cl.
CPC .......... *G01F 23/265* (2013.01); *G01F 23/266* (2013.01)

(58) Field of Classification Search
None
See application file for complete search history.

(56) References Cited

U.S. PATENT DOCUMENTS

| 3,761,805 A | 9/1973 | Dornberger |
| 5,088,325 A | 2/1992 | Eichberger |
| 5,600,997 A | 2/1997 | Kemp |
| 7,307,485 B1 | 12/2007 | Snyder |
| 8,089,289 B1 | 1/2012 | Kremin |
| 2007/0000320 A1* | 1/2007 | Jaeger .................. G01F 23/266 73/304 C |

(Continued)

FOREIGN PATENT DOCUMENTS

EP 0288215 A2 10/1988

*Primary Examiner* — Paul M. West
*Assistant Examiner* — Mark A Shabman (57) ABSTRACT

The present application relates to a system (10) for sensing liquid level in a receptacle (16). The system comprises a capacitive sensing probe (12), for sensing a capacitance between the capacitive sensing probe (12) and an electrically conductive portion of the receptacle (16). The system also comprises a control circuit (15) connected to the capacitive sensing probe (12) for detecting a level of the liquid in the receptacle (16) based on said capacitance, a non-isolated AC power supply (11) arranged to power the control circuit (15), the non-isolated AC power supply (11) having an electrical connection between its input and its output, and at least one filter capacitor (C1, C2) connected in series between the capacitive sensing probe (12) and the control circuit (15).

11 Claims, 6 Drawing Sheets

(56) References Cited

U.S. PATENT DOCUMENTS

| | | | |
|---|---|---|---|
| 2008/0229819 A1* | 9/2008 | Mayleben | F04B 49/06 73/304 C |
| 2009/0139325 A1 | 6/2009 | Cunningham | |
| 2013/0177049 A1* | 7/2013 | Wu | H04B 3/542 375/219 |
| 2013/0201316 A1 | 8/2013 | Binder | |

* cited by examiner

METHOD AND SYSTEM FOR SENSING A LIQUID LEVEL

This application is the U.S. National Phase application under 35 U.S.C. § 371 of International Application No. PCT/EP2016/053612, filed on Feb. 19, 2016, which claims the benefit of International Application No. 15161639.8 filed on Mar. 30, 2015. These applications are hereby incorporated by reference herein.

FIELD OF THE INVENTION

The present invention relates to the sensing of liquid level and in particular, to the sensing/detection of the liquid level of the surface of a liquid utilising a capacitive sensing system.

BACKGROUND OF THE INVENTION

The use of a liquid level sensing probe is a known technique for monitoring the liquid level inside a receptacle, for example, a boiler of a pressurised steam generator. The sensing principle can be resistive or capacitive. Regarding using a capacitive sensing for detecting a liquid level within a receptacle, capacitive sensing probe can be located within a receptacle acting as a first electrode of a capacitive sensor, with a grounded conductive portion of the receptacle acting as a second electrode of the capacitive sensor. In such an arrangement, the liquid within the receptacle acts as a dielectric between the first plate and the second plate. A change in capacitance detected by a capacitive sensor can be utilised for determining a change in the liquid level contained within a receptacle. As the level of a liquid rises and falls in the receptacle, the dielectric effect of the liquid changes the effective capacitance of the capacitive sensor, which is detected by electronic circuitry coupled to the capacitive sensor.

Figure 1:
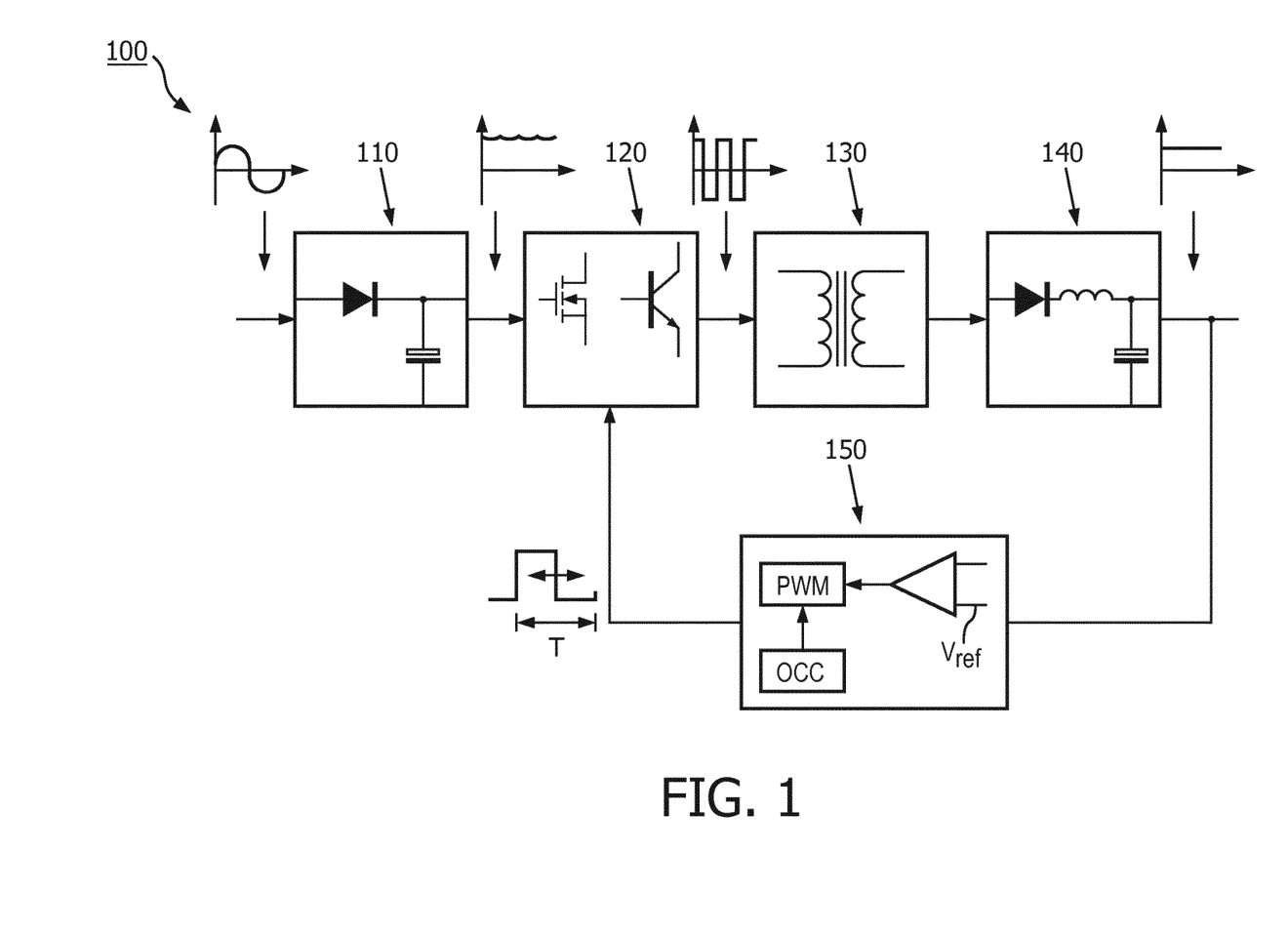
FIG. 1 is a schematic diagram of a conventional isolated switched mode power supply that is used in a system for sensing liquid level.

Various methods have been proposed utilising capacitive sensing to detect the level of a liquid within a grounded receptacle (i.e. the receptacle in connected to earth). In conventional arrangements, isolated switched mode power supply (as depicted by FIG. 1) is required to fulfil the safety requirements of performing capacitive sensing. In such systems, there is an isolated barrier (e.g. a high frequency transformer) that can withstand from a few hundred volts to several thousand volts. However, these known techniques of using isolated switched mode power supplies are relatively expensive and complicated to implement.

SUMMARY OF THE INVENTION

It is an object of the invention to provide a capacitive liquid level sensing system and method which substantially alleviates or overcomes the problems mentioned above.

The invention is defined by the independent claims. The dependent claims define advantageous embodiments.

According to the present invention, there is provided a system for sensing liquid level in a receptacle, said system comprising: a capacitive sensing probe arranged to be in contact with liquid in the receptacle, for sensing a capacitance between the capacitive sensing probe and a grounded electrically conductive portion of the receptacle; a control circuit connected to the capacitive sensing probe to perform capacitive sensing for detecting a level of the liquid in the receptacle; a non-isolated AC power supply arranged to power the control circuit; and at least one filter capacitor connected in series with the capacitive sensing probe and the control circuit.

Such a system is associated with fewer components, and is therefore cheaper compared to a system using an isolated power supplying. Using a filter capacitor (e.g. a Y-capacitor) to isolate probe and control circuit prevents the issue of earth leakage current. Furthermore, another advantage of this arrangement is that by using a filter capacitor (e.g. a Y-capacitor) to achieve the isolation, a cheaper non-isolated power supply can be used.

It will be appreciated that the non-isolated AC power supply will have an input (primary) and an output (secondary) circuit, and that in the non-isolated power supply there is a common ground between the input (primary) and output (secondary) circuit.

In some embodiments, the control circuit is arranged to receive an AC voltage from a mains supply and convert the AC voltage into a zero-crossing signal used to trigger the capacitive sensing. The use of the zero-crossing signal reduces interference from the AC noise.

In some embodiments, the capacitive sensing is triggered with a time delay after a zero crossing point of the zero-crossing signal is detected, wherein the time delay is a pre-determined value or range (e.g. less than 10 ms).

The controller unit may be arranged to perform a capacitive sensing measurement at a rising edge and/or a falling edge of the zero-crossing signal.

The control circuit may be arranged to detect whether an edge of the zero-crossing signal is a rising edge or a falling edge, and the control circuit may be arranged to perform a capacitive sensing measurement using the capacitive sensing probe based on results of the detection done by the control circuit.

The at least one filter capacitor may be a Y-capacitor. In some household appliances, two such Y-capacitors may be used.

The non-isolated AC power supply may be at least one of a switched mode power supply, a capacitive power supply, and a resistive power supply.

The control circuit and the non-isolated AC power supply may be located on a printed circuit board assembly.

The capacitive sensing probe may act as a first electrode of a sensing capacitor, and a grounded electrically conductive portion of the receptacle may act as a second electrode of the sensing capacitor.

According to another aspect of the present invention, there is provided a boiler system comprising a receptacle and a system for sensing, w herein said system comprises: a capacitive sensing probe arranged to be in contact with liquid in the receptacle, e.g. located on top shell of boiler, for sensing a capacitance between the capacitive sensing probe and a grounded electrically conductive portion of the receptacle; a control circuit connected to the capacitive sensing probe, for detecting the level of the liquid in the receptacle; and a non-isolated AC power supply arranged to power the control circuit; wherein the control circuit comprises: a) a conversion unit arranged to convert AC voltage into zero-crossing signal, and b) a controller unit arranged to perform capacitive sensing using the capacitive sensing probe and the zero-crossing signal.

According to another aspect of the present invention, there is provided a method of detecting a level of liquid with a system comprising a capacitive sensing probe, a control circuit, and a non-isolated AC power supply, the method comprising the steps of: converting AC voltage into zero-crossing signal, and performing capacitive sensing using the capacitive sensing probe and the zero-crossing signal.

These and other aspects of the invention will be apparent from and elucidated with reference to the embodiments described hereinafter.

BRIEF DESCRIPTION OF THE DRAWINGS

Embodiments of the invention will now be described, by way of example only, with reference to the accompanying drawings, in which.

DETAILED DESCRIPTION OF THE EMBODIMENTS

In the following, it will be appreciated that power supplies can be termed "isolated" or "non-isolated".

In this context, "isolation" refers to the electrical separation between input (primary) and the output (secondary). In other words, "isolation" refers to the existence of an electrical barrier between the input and output. Most conventional AC/DC and AC/AC converters are isolated for safety reasons.

Isolated power supplies generally include either transformers or optical isolators in both the power and the feedback paths. The input voltage and the output voltage are electrically isolated. The secondary (output) ground is totally isolated from the primary (input) by transformers and/or opto-couplers. In other words, in the following, term "isolated power supply" refers to a power supply in which the input and the output of the power supply are electrically isolated, for example by the use of a magnetic coupling (e.g. transformer) or an optical coupling placed between the input and the output of the power supply.

Non-isolated power supply are such that the input voltage and the output voltage are not electrically isolated. Hence, in a non-isolated power supply, there is an electrical connection between the input and the output. The electrical connection between the input (primary) and output (secondary) circuit in non-isolated power supplies refers to common ground between the input (primary) and output (secondary) circuit. In the following, term "non-isolated power supply refers to a power supply in which the input and the output of the power supply are not electrically isolated (i.e. neither a magnetic coupling nor an optical coupling is used between the input and the output of the power supply). In other words, a non-isolated power supply is a power supply having an electrical connection between the input and the output of the power supply.

References are now being made to FIG. 1, which schematically depicts a diagram of a conventional isolated switched mode power supply 100 that can be used in a system for sensing liquid level.

FIG. 1 shows an AC input voltage signal from an AC power supply being provided to an input rectification and filtering unit 110 which rectifies and filters the AC input voltage. The rectified and filtered signal is then provided to a metal oxide semiconductor field effect transistor (MOSFET) or a bipolar junction transistor 120 for switching of the signal. Subsequently, the switched signal from the MOSFET or the bipolar junction transistor 120 is provided to a power transformer 130, which acts as an isolation barrier between the input voltage and the output voltage. The power transformer acts as an isolation barrier that is able to withstand voltages within the range, for example, of a few hundred volts to several thousand volts. Therefore, when the power supply as illustrated in FIG. 1 is implemented in a system for sensing liquid level within a receptacle, the capacitive sensing electrode is isolated from the live part of the circuitry. The output voltage at the power transformer 130 is then connected to an output rectification and filtering unit 140 which rectifies and filters the output voltage. The resulting signal of this output rectification and filtering is a DC output voltage.

The DC output voltage is provided to a control circuitry 150, which includes a pulse width modulator, an oscillator, and an amplifier. The control circuitry 150 is isolated from the AC input power supply via the use of the power transformer 130. A pulsing signal is output by the pulse width modulator as a duty cycle control signal for control of the MOSFET or bipolar junction transistor 120.

By using an isolated power supply, safety can be enhanced since the input voltage of the circuitry is electrically isolated from the output voltage. Moreover, the use of isolated power supplies allows multiple output voltages, and also the output can be configured to either positive or negative.

The present invention aims to to provide an improved system for sensing liquid level in a receptacle in which the control circuit is powered by a non-isolated AC power supply. This is explained by way of FIGS. 2 to 9.

Figure 2:
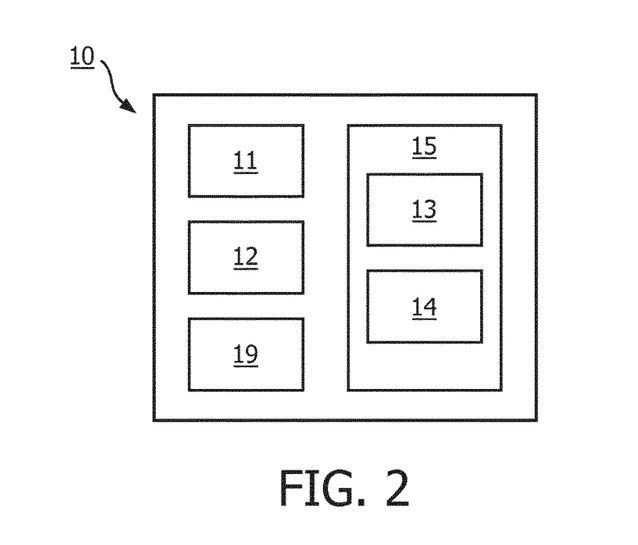
FIG. 2 is a block diagram illustrating the components of a system for sensing liquid level in a receptacle, according to an embodiment of the present invention.

FIG. 2 is a block diagram illustrating the components of a system 10 for sensing liquid level in a receptacle, according to an embodiment of the present invention.

The system 10 comprises a non-isolated power supply 11, a capacitive sensing probe 12, a control circuit 15, and a capacitance 19. The control circuit 15 comprises a controller unit 13 and a conversion unit 14.

In this embodiment, the non-isolated power supply 11 is a switched mode power supply. The further technical details of the non-isolated power supply 11 will be explained in more detail with reference to the converter circuits illustrated in FIGS. 7 to 9.

The conversion unit 14 is powered by the non-isolated power supply 11 and is arranged to convert an AC input voltage signal from a main supply into a square-wave AC zero-crossing signal.

It will be appreciated that the zero-crossing signal is a square wave signal comprises rising edges RE and falling edges FE.

A rising edge RE is a zero-crossing point of the zero-crossing signal at which the square wave rises from a low level to a high level.

A falling edge FE is a zero-crossing point of the zero-crossing signal at which the square wave falls from a high level to a low level.

The rising edge RE of the zero-crossing signal corresponds to the zero-crossing point of the AC input voltage signal at which the sine wave is falling.

The falling edge FE of the zero-crossing signal corresponds to the zero-crossing point of the AC input voltage signal at which the sine wave is rising. This is because the AC zero-crossing signal is a reverse of the AC input voltage signal.

It will be appreciated that there are a number of different types of circuit used for that generating an AC zero-crossing signal that in phase with the AC input voltage.

These zero-crossing edges (zero-crossing points) in the zero-crossing signal are detected by the controller unit 13 in order to be utilised for the control of the sensing capacitor, which is comprised of the capacitive sensing probe 12 and at least a grounded electrically conductive portion of a receptacle.

The capacitive sensing probe 12 is connected to the control circuit 15, and is configured such that it acts as a first electrode (E1) of a sensing capacitor when used in conjunction with a grounded electrically conductive portion of a receptacle, which acts as a second electrode (E2) of the sensing capacitor.

The capacitance 19 is arranged electrically in series between the control circuit 15 and the capacitive sensing probe 12. The function of the capacitance 16 will be explained in more detail below.

A capacitive sensing measurement is performed using the sensor capacitor (electrodes E1 and E2) according to the zero-crossing signal. The detailed control of the capacitive sensing operation will be explained in more detail with respect to FIGS. 3 to 6.

Figure 3:
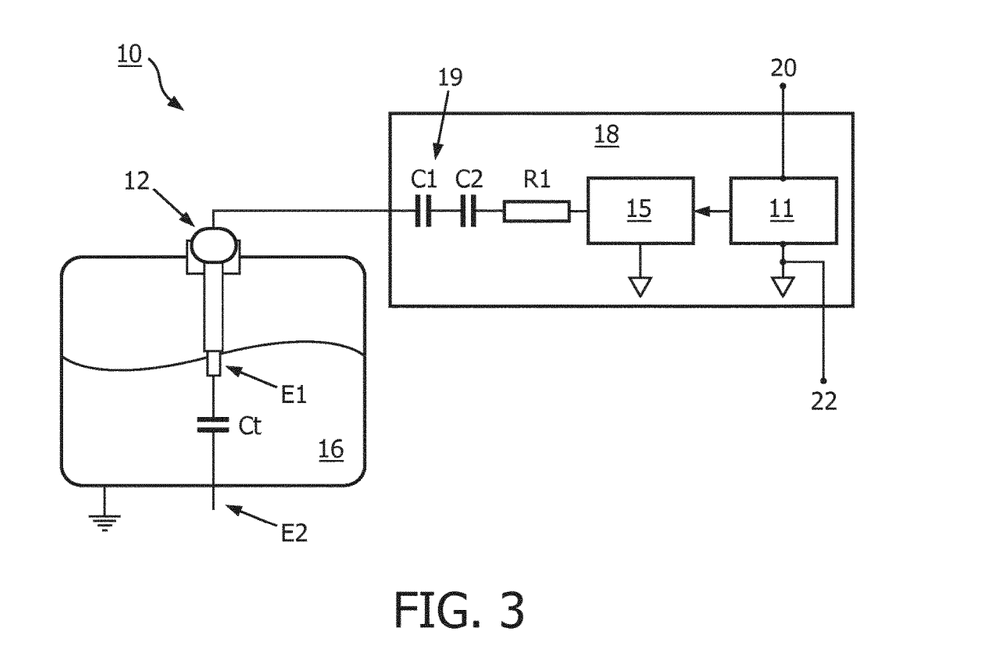
FIG. 3 is a schematic diagram illustrating the detailed configuration of the system 10 of FIG. 2.

FIG. 3 is a schematic diagram illustrating a more detailed configuration of the system 10 of FIG. 2 according to an embodiment of the invention.

In this embodiment, the non-isolated AC power supply 11 and the control circuit 15 as illustrated in FIG. 2 are for example provided on a printed circuit board assembly (PCBA) 18. The capacitive sensing probe 12 and a receptacle 16 are also illustrated in FIG. 3.

In this embodiment, the non-isolated AC power supply 11 is a switched mode power supply connected to Live 20 and Neutral 22. The non-isolated power supply 11 of FIG. 3 has the same function as the non-isolated power supply 11 of FIG. 2. The further technical details of the non-isolated power supply 11 will be explained in more detail with reference to the converter circuits illustrated in FIGS. 7 to 9.

In alternative embodiments of the present invention, the non-isolated AC power supply 11 is either one of a capacitive power supply and a resistive power supply.

The printed circuit board assembly 18 comprises a capacitance 19, which in this embodiment comprises at least one filter capacitor (C1, C2) connected in series with the capacitive sensing probe (12) and the control circuit (15). The filter capacitor advantageously comprises a first capacitor C1 and a second capacitor C2. In this embodiment, the capacitors C1 and C2 may have values that range from 100 pF to 4700 pF.

Also a first resistor R1 is also arranged in series with C1 and C2 in this embodiment. However, in other embodiments, the first resistor R1 may not be needed. The value of the first resistor R1 may range from 10 to 10 K ohm.

The non-isolated power supply 11 is connected between Live 20 and Neutral 22 in this embodiment. Live carries an alternative current between the power grid and the appliance. Neutral also carries an alternative current between the power grid and the appliance. Neutral is connected to ground and therefore has nearly the same electric potential as earth.

As discussed in relation to FIG. 2, the control circuit 15 is arranged to convert an AC input voltage (e.g. from the mains) into a square-wave AC zero-crossing signal. This zero-crossing signal is used to control the capacitive sensing operation of the sensing capacitor which is comprised of the capacitive sensing probe 12 as a first electrode E1 and at least a grounded electrically conductive portion of the receptacle 16 as a second electrode E2.

In an isolated power supply, the secondary circuit is considered a non live part, and the user can safety touch/access the secondary circuit. In a non-isolated power supply, the common ground electrically connects the primary and the secondary circuit. Hence, in a non-isolated power supply, the secondary circuit is considered a live part and must not be accessed by the user.

In this embodiment, the receptacle 16 is a boiler of a pressurised steam generator.

The first capacitor C1 and the second capacitor C2 are filter capacitors. In this embodiment, the first capacitor C2 and the second capacitor C2 are Y-capacitors. Class Y capacitors are mains filter capacitors which adhere to the safety requirements of European standards for household electrical appliances. The use of the first capacitor C1 and the second capacitor C2 is for the isolation of the capacitive sensing probe from the live part of the electronic circuitry. The first capacitor C1 and the second capacitor C2 therefore provide a protective impedance. Components that are located after the protective impedance are not considered to be a live part, and hence can be accessed by the user.

Accordingly, safety requirements can be met while using a non-isolated power supply in the system for sensing liquid levels.

It is noted that the capacitor Ct illustrated in FIG. 3 is a merely visual representation of the capacitance derived from the liquid between the capacitive sensing probe 12 and the grounded electrically conductive portion of the receptacle 16, rather than an actual physical capacitor in the system.

In alternative embodiments of the present invention, the entire receptacle 16 acts as the second electrode E2 of the sensing capacitor. In such embodiments, the entire receptacle 16 is conductive and electrically grounded.

In this embodiment, using a zero-crossing signal helps improve the issue of AC noise if Live is used as the digital ground. However, embodiments of the invention are not limited to this. In other arrangements, if the digital ground is always Neutral, then using a zero-cross signal in this way is not essential.

Figure 4A:
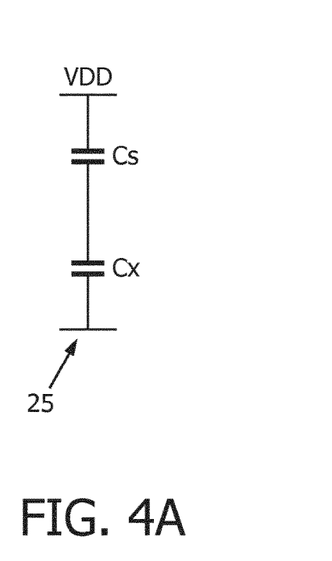
FIGS. 4A and 4B are schematic diagrams illustrating an operation of capacitive sensing.
Figure 4B:
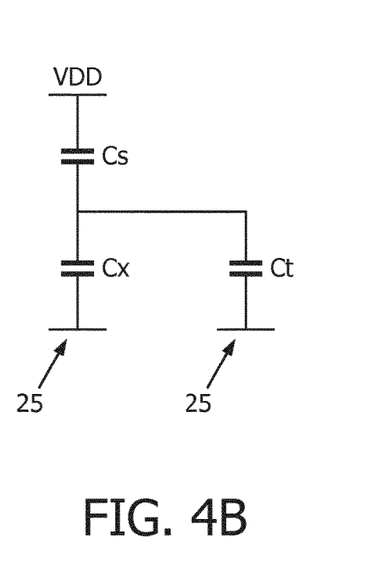

FIGS. 4A and 4B are schematic diagrams illustrating an operation of capacitive sensing using charge transfer technology. In general terms, such charge transfer technology works by applying a voltage pulse to a series connection of a capacitance Cx and a capacitor Cs. The capacitor Cs accumulates charges over a number of charge transfer pulses, and amount of charge transferred to Cs per pulse depends on Cx.

FIG. 4A is a simplified representation of the capacitive sensing of the system 10 when the capacitive sensing probe 12 is not in contact with liquid in the receptacle 16.

FIG. 4B is a simplified representation of the capacitive sensing of the system 10 when the capacitive sensing probe 12 is in contact with liquid in the receptacle 16.

As seen in FIG. 4A, there is a capacitor Cs and a capacitor Cx provided between supply voltage VDD and earth 25. Capacitor Cs is a sampling capacitor and is physical capacitor on the printed circuit board assembly 18 as shown in FIG. 3. Capacitor Cs may have a value of 1 nF to 100 nF. Capacitor Cx is a virtual capacitor that represents the capacitance between the capacitive sensing probe 12 and a grounded electrically conductive portion of the receptacle 16.

In FIG. 4B, in addition to the capacitor Cs and capacitor Cx as described in relation to FIG. 4A in the above paragraph, there is provided a capacitor Ct in parallel with capacitor Cx provided in the circuit. The capacitor Ct is representative of the capacitance provided by the liquid in the receptacle 16 (as illustrated in FIG. 3), which acts as a dielectric between the capacitive sensing probe 12 and the grounded electrically conductive portion of the receptacle 16.

The capacitor Cs is sampling capacitor on the printed circuit board assembly 18 (it is a real capacitor with the range of 1 nF-100 nF). Cx is a virtual capacitor that represents capacitance between sensing probe to earthed boiler metal shelf. Normally Cs/Cx ratio range is for example around 1000:1.

As explained above with regard to FIG. 3, the capacitive sensing probe 12 acts as a first electrode E1 of a sensing capacitor, and the grounded electrically conductive portion of the receptacle 16 acts as a second electrode E2 of the sensing capacitor. In FIG. 4B, the sensing capacitor is represented by the capacitor Ct provided between in parallel to the capacitor Cx and between supply voltage VDD and earth.

Figure 4C:
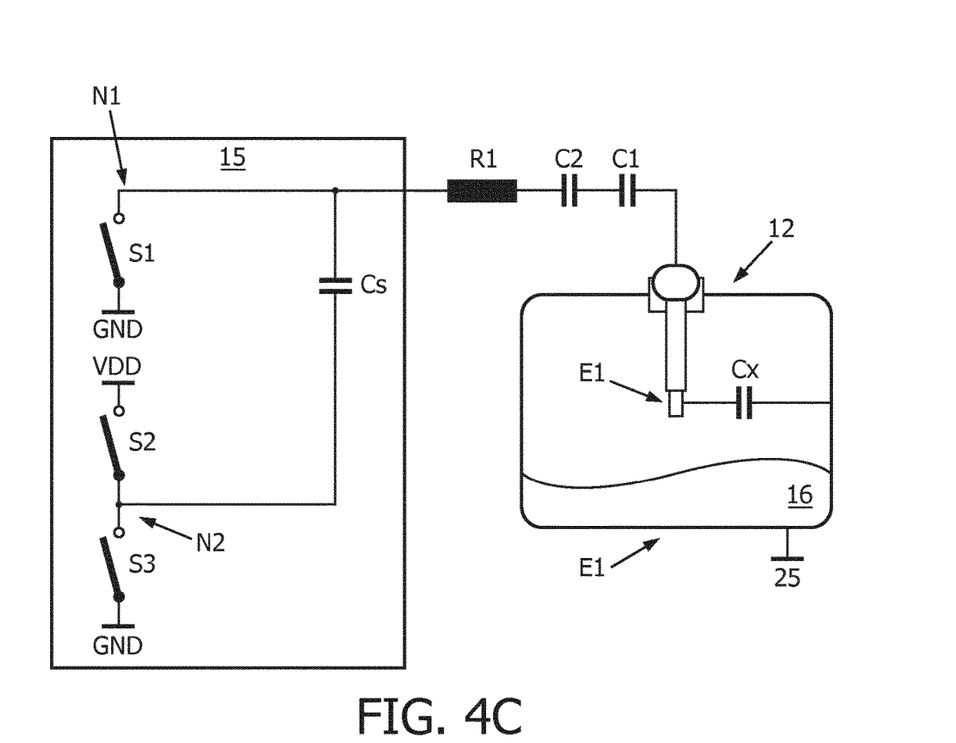

FIG. 4C shows an example schematic arrangement of the controller 15, first resistor R1, capacitors C1, C2, the capacitive sensing probe 12, and the receptacle 16. In FIG. 4C, the level of the liquid is below the capacitive sensing probe 12, the virtual capacitance Cx is shown. This is the virtual capacitance between the capacitive sensing probe 12 and the receptacle 16. As discussed, capacitance Cs is a real capacitor with a value of 1 nf to 100 nf. The capacitance Cs is much greater than capacitance Cx, and the Cs/Cx ratio may be around 1000:1.

In the embodiment shown in FIG. 4C, the controller 15 comprises three switches S1, S2 and S3, though embodiments of the invention are not limited to this arrangement. In this embodiment, switches S1, S2 and S3 are CMOS transistors. Switch S1 is connected between a node N1 and ground GND. One of the electrodes of capacitor Cs is connected to node N1. Switch S2 is connected between the supply voltage VDD and a node N2, and switch S3 is connected between ground GND and the node N2. The other of the electrodes of capacitor Cs is connected to node N2. By appropriate control of switches S1, S2 and S3, charge can be transferred into the virtual capacitance Cx through the capacitance Cs.

The signal received at the control unit 13 is in terms of the number of counts (signal count). The signal count is the number of pulses it takes for the voltage across the capacitor Cs, i.e. Vcs, to reach a threshold level. As each pulse deposits more charge, Vcs increases faster. The threshold level is predetermined in accordance to the purpose of the system. The signal count is less when the capacitive sensing probe 12 is in contact with liquid in the receptacle 16, compared to when the capacitive sensing probe 12 is not in contact with liquid in the receptacle. This is because when the capacitive sensing probe 12 is in contact with liquid in the receptacle, a capacitance from the capacitor Ct is provided in parallel to the capacitor Cx (comparing FIGS. 4A and 4B), and charge builds up in the capacitor Cs more quickly. As a result, by monitoring the signal count required for the voltage across the capacitor Cs to reach the threshold level, the control unit 13 is able to determine whether the capacitive sensing probe is in contact with liquid in the receptacle 16. The pulse generation and counting can done using a charge transfer based technology.

As an example, when the capacitive sensing probe 12 is in contact with liquid in the receptacle 16, the signal count is 600. When the capacitive sensing probe 12 is not in contact with liquid in the receptacle 16, the signal count becomes 300. This way, by comparing the signal count, it can be determined whether the capacitive sensing probe 12 in contact with liquid in the receptacle 16. Hence, the sensing system can detect whether water is above or below a certain level (based on the probe position).

At a rising edge RE of the zero-crossing signal, the potential difference between VDD and earth is positive and increasing, which will in turn increase the amount of charge transferred in each pulse. Hence, it takes fewer pulses (i.e. shorter time) for Vcs to reach the threshold level. On the other hand, at a falling edge FE of the zero-crossing signal, the potential difference between VDD and earth is negative. This reduces the amount of charge transferred in each pulse which means more pulses are required (i.e. longer time) for Vcs to reach the threshold level. As a result, the effect of the potential difference between VDD and earth on the signal count would increase the signal count and cause the signal count to be inaccurate and unreliable.

In other words, the influence of the potential difference between VDD and earth at a falling edge FE would cause the signal count measured when the capacitive sensing probe 12 is in contact with liquid in the receptacle 16 to increase, and in some cases even beyond the signal count when the capacitive sensing probe 12 is not in contact with liquid in the receptacle 16. For example, the signal count measured at a falling edge FE when the capacitive sensing probe 12 is in contact with liquid in the receptacle 16 may be 650 while the signal count measured when the capacitive probe 12 is not in contact with liquid in the receptacle 16 is 600. In this instance, the control unit 13 would not be able to differentiate whether the capacitive sensing probe 12 is in contact with liquid in the receptacle 16 or not by comparing signal count.

Hence, it is preferable in the present invention that capacitive sensing is performed at rising edges RE of the zero-crossing signal (or shortly thereafter).

Nevertheless, in alternative embodiments of the present invention, capacitive sensing measurements may be performed during a falling edge of the zero-crossing signal.

In some embodiments, the controller obtains the sensing result by calling an appropriate sensing library. However, but when to call the library can be important, because if the sensing is triggered (i.e. the library call) at wrong time, the AC ground noise (due to the non-isolated power supply) can affect the sensing and give wrong result. It has been found that when the sensing is at a rising edge of the zero-crossing signal, a more accurate signal is obtained because the AC ground noise can even help amplify the signal, while sense at falling zero-crossing, the AC ground noise attenuate the signal and may even result wrong sensing signal. Therefore, embodiments of the invention can make use of the zero-crossing signal to manage the AC ground noise to get accurate capacitive sensing signal.

Figure 5:
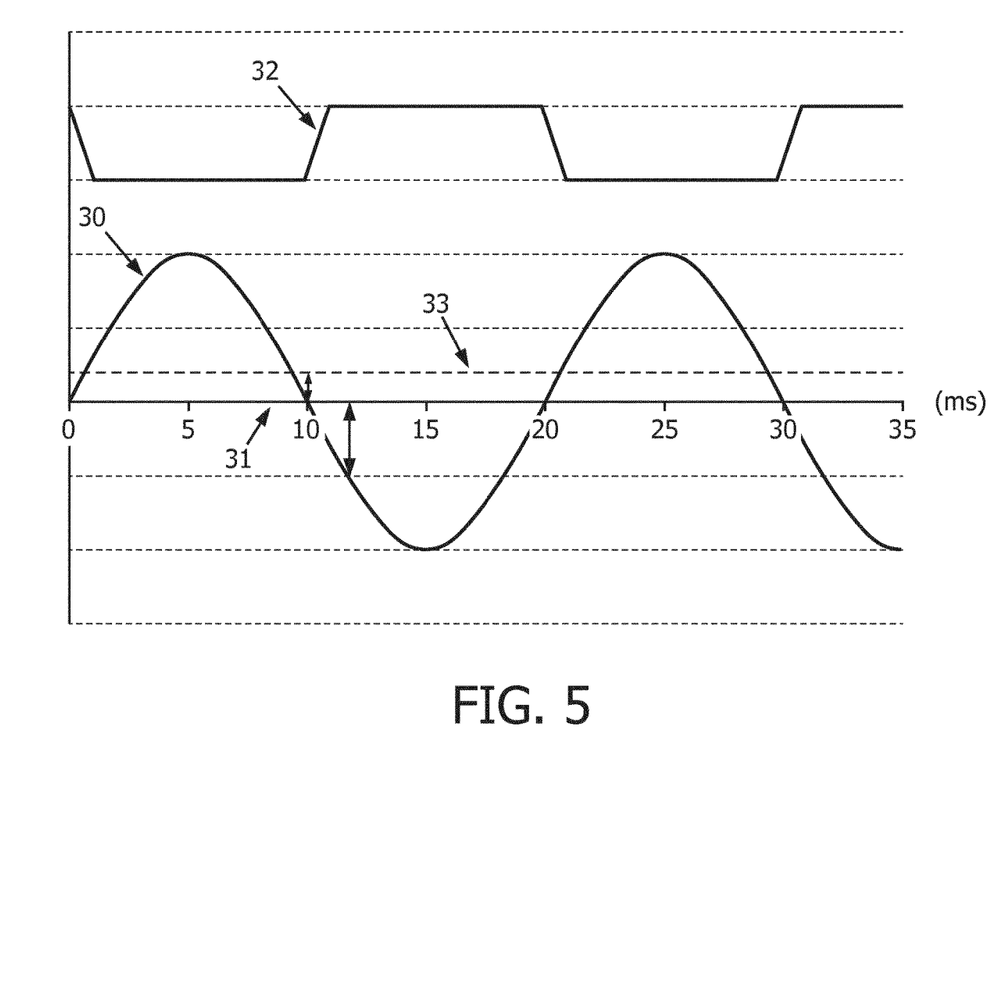
FIG. 5 is a graph illustrating earth, digital ground, and zero-crossing signal with respect to time.

FIG. 5 is a graph illustrating earth, digital ground (Live, 50 Hz), and zero-crossing signal with respect to time.

As shown in FIG. 5, the variation of the earth signal $V_{earth}$ 30, the digital ground signal (31), and the zero-crossing signal 32 are illustrated as voltage against time (ms) in the graph. In this embodiment, live is used as the digital ground in the circuit configuration. Hence, the earth signal varies in a similar manner as an AC voltage with reference to digital ground. The level of supply voltage VDD 33 is also provided on the graph as a reference.

At a rising edge RE of the zero-crossing signal 32, the difference between supply voltage signal and earth signal (VDD−$V_{earth}$) is positive and increasing. Therefore, as explained with reference to FIGS. 4A and 4B, the amount of charge transferred in each pulse is increased and accordingly it takes fewer pulses (i.e. shorter time) for voltage across Cs (i.e. Vcs) to reach the threshold level.

At a falling edge FE of the zero-crossing signal, the difference between supply voltage signal and earth signal (VDD−$V_{earth}$) is negative. As explained with reference to FIGS. 4A and 4B, this reduces the amount of charge transferred in each pulse which means more pulses are required (i.e. longer time) for Vcs to reach the threshold level.

This can be illustrated with reference to Equation 1, as follows:

$$Vcs_i = \{(VDD - V_{earth}) - Vcs_{(i-1)}\} * (Cs+Cx)/Cx + Vcs_{(i-1)}$$

where $V_{CSi}$ is the voltage for sampling capacitor, VDD is the supply voltage, $V_{earth}$ is the earth voltage, $V_{CS(i-1)}$ is voltage for sampling capacitor (previous), Cs is the sampling capacitance, and Cx is the electrode capacitance to Earth (virtual).

The invention also relates to a method of detecting a level of liquid with a system comprising a capacitive sensing probe (12), a control circuit (15) arranged to receive an AC voltage from a mains supply, and a non-isolated AC power supply (11) arranged to power the control circuit (15), and at least one filter capacitor (C1, C2) connected in series with the capacitive sensing probe (12) and the control circuit (15). The method comprises the steps of:
  using the control circuit (15) to convert AC voltage from the mains supply into zero-crossing signal, and
  performing capacitive sensing using the capacitive sensing probe (12) at a time determined by the zero-crossing signal.

Figure 6:
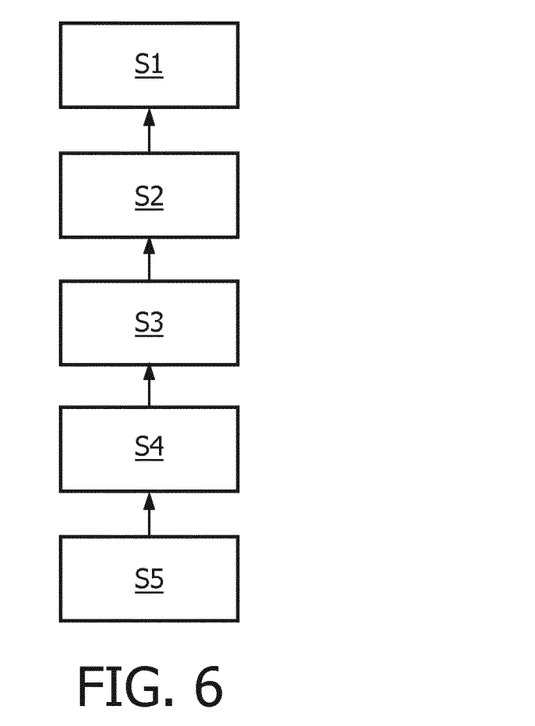
FIG. 6 is a flowchart illustrating a method of sensing a liquid level within a system for sensing a liquid level in a receptacle, according to an embodiment of the present invention.

FIG. 6 is a detailed flowchart illustrating a method of sensing a liquid level within a system for sensing a liquid level in a receptacle, according to an embodiment of the present invention.

At step S1 of the flowchart, the operation of performing a sensing measurement of a liquid level within a system starts. An AC sine wave (e.g. from the mains) is converted into low voltage square wave, i.e. the zero-crossing signal.

At step S2, the AC zero-crossing signal is fed to the controller unit 14 of the control circuit 15. The zero-crossing signal is used to control when the controller unit 13 detects a level of the liquid using a sensing measurement from the capacitive sensing probe 12.

At step S3, a rising edge RE or a falling edge FE in the AC zero-crossing signal is detected by the controller unit 13 of the control circuit 15.

As explained above, a rising edge RE is a zero-crossing point of the zero-crossing signal at which the square wave rises from a low level to a high level. A falling edge FE is a zero-crossing point of the zero-crossing signal at which the square wave falls from a high level to a low level. These zero-crossing edges are detected in the zero-crossing signal in step S3 in order to be utilised for the control of the liquid level sensing operation.

At step S4, it is determined whether a rising edge RE or a falling edge FE is detected in the step S3. The result of this determination at step S4 will be used in the subsequent step S5 in order to determine whether to perform a capacitive sensing measurement, i.e. capacitive sensing data capture of the sensing capacitor (i.e. the first electrode E1 and the second electrode E2).

In order to ensure the grounding effect of the signal of the capacitive sensing probe 12 is the same, the zero-crossing signal is used to sense the same point of the AC input voltage cycle in sine wave such that capacitive sensing measurements are always performed at the same point of each cycle of the sine wave of the AC input voltage cycle. This ensures that capacitive sensing data is captured at points of the AC input voltage cycle where AC noise interference is minimum. Therefore, reliable and accurate results of capacitive sensing can be achieved.

In the present embodiment, live is used as the digital ground in the circuit configuration. As a result, the earth signal varies in a similar manner as an AC voltage with reference to digital ground. When a capacitive sensing measurement is performed at a rising edge RE of the zero-crossing signal, the earth signal is falling, and this amplifies the signal as explained with respect to FIG. 5. When a capacitive sensing measurement is performed at a falling edge FE of the zero-crossing signal, the signal is attenuated. As a result, it is preferable to only perform capacitive sensing measurements at rising edges RE of the zero-crossing signal in order to obtain reliable data from the capacitive sensing probe 12.

At step S5, a capacitive sensing measurement is performed based on the results of the determination at step S4. In this present embodiment, if it is detected that the zero-crossing point of the AC input voltage is a rising edge, the controller unit 13 is arranged to control the capacitive sensing probe 12 to perform a capacitive sensing measurement. The sensing measurement needs to be finished before next zero-cross signal detected in this embodiment. In other words, the sensing time needs to be within 10 ms in the case of 50 Hz power supply. If it is detected that the zero-crossing point of the AC input voltage is a falling edge, the controller unit 13 does not perform any capacitive sensing measurement. In other words, in this embodiment, it is only during at rising edges RE of the zero-crossing signal the controller unit is arranged to control the capacitive sensing probe 12 to perform a capacitive sensing measurement.

Through the use of the zero-crossing signal, AC interference noise introduced by the use of non-isolated power supplies in the system for sensing liquid levels can be reduced. This is because in some embodiments of the present invention, capacitive sensing data is captured during zero-crossing (i.e. the point(s) at which the AC voltage input crosses zero) at which the influence of AC interference noise is minimum.

Furthermore, by only performing sensing measurements at rising edges RE of the zero-crossing signal, the noise influence derived from the potential difference between earth and digital ground can even be beneficial if Live is the digital ground. This is because the increasing potential difference between Earth and digital ground can amplify the capcitive sensing signal (faster charge transfer, fewer counts) when capacitive sensing is performed during rising edge(s) of the zero-crossing signal.

For example, when Neutral is the digital ground, AC noise is already minimum, and the rising or falling edge makes no difference. As an example, when water is not touching probe, the system may get 600 counts, and when it touches, the system may get 300. If Live is the digital ground, there is big difference between rising and falling edge, and the system can get 150 counts for rising edge (signal is amplified, bigger difference compare to not touching water signal), and 500 or even 650 for falling edge (signal attenuated, less difference or even negative signal compare to not touching water signal).

It will be appreciated that in alternative embodiments, the method steps may be performed in different sequence from what is described above, and that some method steps may be omitted. For example, even though it is beneficial to determine whether an edge is a rising edge or a falling edge, this step (S4) may not be necessary in some alternative embodiments. In these alternative embodiments, capacitive sensing measurements are performed at both rising edges and falling edges of the zero-crossing signal. In another example, if Neutral is the digital ground, detection of rising/falling edge of zero-crossing signal is not that critical as the AC noise is already minimum.

As discussed, in some embodiments of the invention, the controller will trigger the sensing n ms after detection of a zero crossing point of the zero-crossing signal. In some embodiments, n=0, which means that the sensing is triggered at exactly the zero-crossing point. However, in other embodiments, due to different design or architecture it is possible to trigger the sensing a certain delay (e.g. 3 ms, 5 ms or 7 ms) after detection of the zero-cross point. In other words, embodiments of the invention can use zero-crossing signal as the reference point, and the actual detection timing can be any point between two zero-crossing points, which is determined by individual application.

Embodiments of the invention can use a variety of capacitive sensing methodologies, e.g. triggered on the basis of the zero crossing signal. For example, embodiments of the invention can use a capacitive field sensor with sigma-delta modulator (see U.S. Pat. No. 8,089,289B1), a capacitance sensor using relaxation oscillators (see U.S. Pat. No. 7,307,485B1), or methods of and systems for measuring capacitance using a constant current charging technique (see U.S. Pat. No. 3,761,805A).

References will now be made to FIGS. 7 to 9, which are power converter circuits to be implemented in a system for sensing liquid level in a receptacle, according to embodiments of the present invention. In contrast to the isolated basic switched mode power supply as illustrated in FIG. 1, these converter circuits are non-isolated, which means when implemented in the system there is no electrical isolation barrier between the input and output. Hence, the non-isolated power supplies of FIGS. 7 to 9 are possible examples of the non-isolated power supply 11 shown in FIG. 1.

Figure 7:
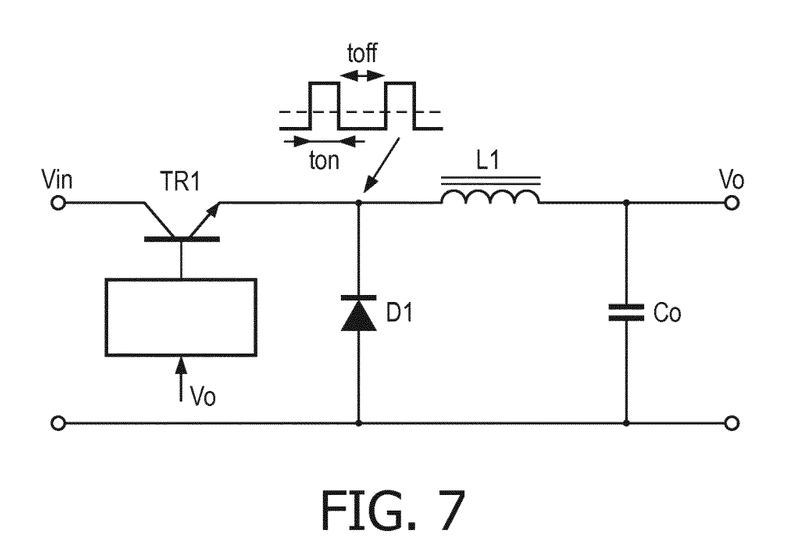
FIG. 7 is a schematic diagram of a buck converter circuit according to an embodiment of the present invention.
Figure 8:
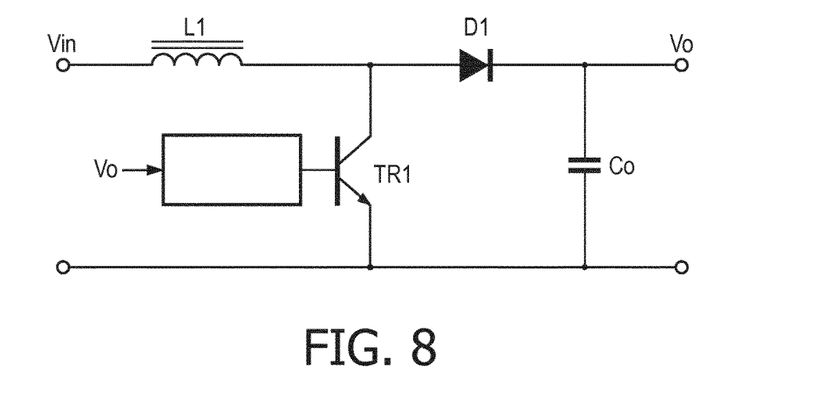
FIG. 8 is a schematic diagram of a boost converter circuit according to an embodiment of the present invention.
Figure 9:
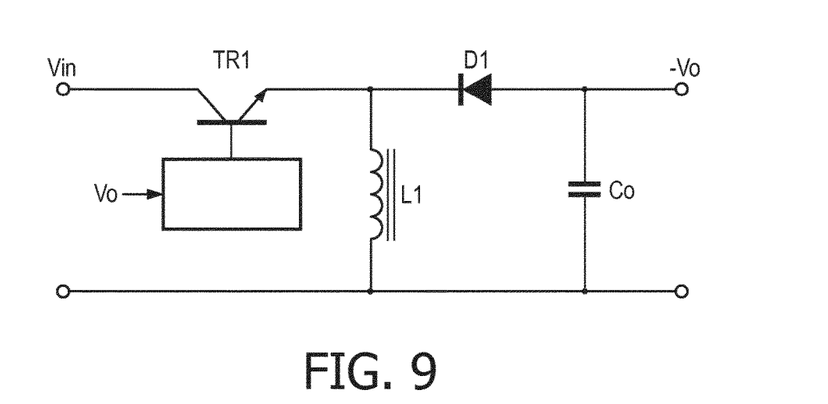
FIG. 9 is a schematic diagram of a buck-boost converter circuit according to an embodiment of the present invention.

As shown in FIGS. 7 to 9, Vin in the input voltage, Vout is the output voltage. In practical arrangements, Vin can be Live, Vo can be the supply voltage VDD and Neutral can be ground.

FIG. 7 is a schematic diagram of a buck converter circuit according to an embodiment of the present invention.

As shown in FIG. 7, the buck converter comprises a control circuitry, a switching transistor TR1 and a flywheel circuit comprising a diode D1, an inductor L1, and a capacitor Co.

When the switching transistor TR1 is switched on, power will flow directly to the output terminals. This voltage must also pass through the inductor L1, which will cause current to build up in it in much the same way that a capacitor charges. When the switching transistor TR1 is switched off, the stored current in the inductor will cause the diode D1 to become forward bias, which will let it freewheel and allow the current to be delivered to the load that is connected to the output terminals.

FIG. 8 is a schematic diagram of a boost converter according to an embodiment of the present invention.

As shown in FIG. 8, the boost converter comprises a control circuitry, a switching transistor TR1, a diode D1, an inductor L1, and a capacitor Co.

Compared to the buck converter of FIG. 7, the switching transistor TR1 has been moved to a point after the inductor L1 and it is connected directly across the positive and negative lines of the output. The freewheeling diode D1 is connected in series and reverse bias with the inductor L1. The capacitor Co remains in parallel with the output voltage terminals to provide filtering.

FIG. 9 is a schematic diagram of a buck-boost converter according to an embodiment of the present invention.

As shown in FIG. 9, the buck-boost converter comprises a control circuitry, a switching transistor TR1, a diode D1, an inductor L1, and a capacitor Co.

The switching transistor TR1 is connected in series like the buck converter of FIG. 5, and compared to the buck converter of FIG. 7 the inductor L1 has been moved to a position where it is connected in parallel with the output terminals.

The switching transistor TR1 controls the voltage to the output in this circuit. When it is switched on, the inductor L1 will store energy. When the switching transistor TR1 is switched off, the stored energy will be large enough to forward bias the diode and pass voltage to the output terminals. Since this circuit has the basic operation of both the buck and boost converters, it means that the output voltage can be regulated both above and below the input-voltage level. For this reason the buck-boost converter is more popular. The waveforms for this type of circuit are similar to the boost converter.

Comparing the isolated power supply as shown in FIG. 1 and the non-isolated power supplies of FIGS. 7 to 9, it can be seen that fewer components are required in non-isolated power supplies. Therefore, the costs involved in building the circuitry using a non-isolated power supply can be reduced.

In configurations with non-isolated supplies, the input voltage and the output voltage are not electrically isolated, safety components may be required for some applications for the separation between the input voltage and the output voltage. In some embodiments, this is achieved by the use of two Class-Y capacitors (Y-capacitors) as explained in relation to the first capacitor C1 and the second capacitor C2 in FIG. 3 above.

Using, a non-isolated power supply for the controller allows using fewer components than an isolated power supply, and is therefore cheaper than a system using an isolated power supply. Using a filter capacitor (e.g. a Y-capacitor) to isolate the probe and control circuit prevents the issue of earth leakage current. Furthermore, another advantage of this arrangement is that by using a filter capacitor (e.g. a Y-capacitor) to achieve the isolation, a cheaper non-isolated power supply can be used.

It will be appreciated that the use non-isolated power supplies would be expected to introduce AC interference noise to a sensing system. In order to overcome this problem, a zero-crossing signal can be used such that capacitive sensing data is captured only at zero-crossing points of the AC input voltage signal at which the AC interference noise is the minimum or in favour of capacitive sensing. Hence, embodiments of the invention can provide sensing systems that are associated with the advantages of using non-isolated power supplies in terms of cost while reducing the issues of AC interference noise.

It will be appreciated that the term "comprising" does not exclude other elements or steps and that the indefinite article "a" or "an" does not exclude a plurality. A single processor may fulfil the functions of several items recited in the claims. The mere fact that certain measures are recited in mutually different dependent claims does not indicate that a combination of these measures cannot be used to an advantage. Any reference signs in the claims should not be construed as limiting the scope of the claims.

The invention claimed is:

1. A system for sensing liquid level in a receptacle, said system comprising:
    a capacitive sensing probe for sensing a capacitance between the capacitive sensing probe and a grounded electrically conductive portion of the receptacle;
    a control circuit connected to the capacitive sensing probe for detecting a level of the liquid in the receptacle based on said capacitance;
    a non-isolated AC power supply arranged to power the control circuit, the non-isolated AC power supply having an electrical connection between its input and its output; and
    at least one filter capacitor (C1, C2) connected in series between the capacitive sensing probe and the control circuit, wherein the at least one filter capacitor (i) isolates the capacitive sensing probe from an electrically live part of the non-isolated AC power supply and the control circuit and (ii) prevents earth leakage current from the non-isolated AC power supply with respect to the capacitive sensing probe.

2. The system as claimed in claim 1, wherein the control circuit is arranged to receive an AC voltage from a mains supply and convert the AC voltage into a zero-crossing signal used to trigger the capacitive sensing.

3. The system as claimed in claim 1, wherein the control circuit is arranged to perform a capacitive sensing measurement at a rising edge and/or a falling edge of the zero-crossing signal.

4. The system as claimed in claim 1, wherein the at least one filter capacitor (C1, C2) is a Y-capacitor.

5. The system as claimed in claim 1, wherein the non-isolated AC power supply is at least one of a switched mode power supply, a capacitive power supply, and a resistive power supply.

6. The system as claimed in claim 1, wherein the control circuit and the non-isolated AC power supply are located on a printed circuit board assembly.

7. The system as claimed in claim 1, wherein the capacitive sensing probe acts as a first electrode (E1) of a sensing capacitor, and a grounded electrically conductive portion of the receptacle acts a second electrode (E2) of the sensing capacitor.

8. A boiler system comprising a receptacle and a system as claimed in claim 1, wherein the capacitive sensing probe is located within the receptacle and is electrically insulated from the receptacle.

9. A system for sensing liquid level in a receptacle, said system comprising:
    a capacitive sensing probe for sensing a capacitance between the capacitive sensing probe and an electrically conductive portion of the receptacle;
    a control circuit connected to the capacitive sensing probe for detecting a level of the liquid in the receptacle based on said capacitance;
    a non-isolated AC power supply arranged to power the control circuit, the non-isolated AC power supply having an electrical connection between its input and its output; and
    at least one filter capacitor (C1, C2) connected in series between the capacitive sensing probe and the control circuit, wherein the control circuit is arranged to receive an AC voltage from a mains supply and convert the AC voltage into a zero-crossing signal used to trigger the capacitive sensing, and wherein the capacitive sensing is triggered with a time delay after a zero-crossing point of zero-crossing signal is detected, the time delay is a pre-determined value or range.

10. A system for sensing liquid level in a receptacle, said system comprising:
    a capacitive sensing probe for sensing a capacitance between the capacitive sensing probe and an electrically conductive portion of the receptacle;
    a control circuit connected to the capacitive sensing probe for detecting a level of the liquid in the receptacle based on said capacitance;
    a non-isolated AC power supply arranged to power the control circuit, the non-isolated AC power supply having an electrical connection between its input and its output; and
    at least one filter capacitor (C1, C2) connected in series between the capacitive sensing probe and the control circuit, wherein the control circuit is arranged to detect whether an edge of the zero-crossing signal is a rising edge or a falling edge, and the control circuit is arranged to detect the level of the liquid in the receptacle based on the capacitance of the capacitive sensing probe based on results of the detection.

11. A method of detecting a level of liquid with a system comprising a capacitive sensing probe for sensing a capacitance between the capacitive sensing probe and a grounded electrically conductive portion of a receptacle, a control circuit connected to the capacitive sensing probe for detecting a level of the liquid in the receptacle based on said capacitance and arranged to receive an AC voltage from a mains supply, and a non-isolated AC power supply arranged to power the control circuit, wherein the non-isolated AC power supply has an electrical connection between its input and its output, and at least one filter capacitor (C1, C2) connected in series between the capacitive sensing probe and the control circuit, wherein the at least one filter capacitor (i) isolates the capacitive sensing probe from an electrically live part of the non-isolated AC power supply and the control circuit and (ii) prevents earth leakage current from the non-isolated AC power supply with respect to the capacitive sensing probe, the method comprising:
    using the control circuit to convert AC voltage from the mains supply into a zero-crossing signal, and
    performing capacitive sensing using the capacitive sensing probe at a time determined by the zero-crossing signal.

* * * * *